United States Patent
Santiago-Fernandez et al.

(10) Patent No.: US 10,896,140 B2
(45) Date of Patent: Jan. 19, 2021

(54) CONTROLLING OPERATION OF MULTIPLE COMPUTATIONAL ENGINES

(71) Applicant: International Business Machines Corporation, Armonk, NY (US)

(72) Inventors: William Santiago-Fernandez, Hopewell Junction, NY (US); Tamas Visegrady, Zurich (CH); Silvio Dragone, Olten (CH); Michael Charles Osborne, Richterswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/389,530

(22) Filed: Apr. 19, 2019

(65) Prior Publication Data

US 2020/0334175 A1 Oct. 22, 2020

(51) Int. Cl.
*G06F 13/16* (2006.01)
*H04L 9/08* (2006.01)
*G06F 9/4401* (2018.01)
*G06F 9/30* (2018.01)
*G06F 21/62* (2013.01)

(52) U.S. Cl.
CPC ...... *G06F 13/1605* (2013.01); *G06F 9/30101* (2013.01); *G06F 9/4411* (2013.01); *G06F 21/6218* (2013.01); *H04L 9/0877* (2013.01)

(58) Field of Classification Search
CPC .............. G06F 13/1605; G06F 9/4411; G06F 21/6218; H04L 9/0877

USPC ......................................................... 710/240
See application file for complete search history.

(56) References Cited

U.S. PATENT DOCUMENTS

| 5,349,564 | A  * | 9/1994 | Miyake ................... | G06F 13/24 365/195 |
| 6,594,713 | B1 * | 7/2003 | Fuoco ..................... | G06F 13/28 709/250 |

(Continued)

OTHER PUBLICATIONS

IBM Corp., "Linux for zSeries ELF Application Binary Interface Supplement," Mar. 2001, 72 pages.

(Continued)

*Primary Examiner* — Paul R. Myers
(74) *Attorney, Agent, or Firm* — Cantor Colburn LLP; Daniel Morris

(57) ABSTRACT

The present disclosure relates to a computer-implemented method for controlling operation of multiple computational engines of a physical computing device. The computer-implemented method includes providing a multiplexer module in the device, the multiplexer module including a first and second memory region. The multiplexer module may receive from a first driver at the multiplexer module a data processing request to be processed by a first set of one or more computational engines of the computational engines. Subsequent to receiving the data processing request, the multiplexer module may assign a request sub-region of the first region and a response sub-region of the second region to the first driver. Data indicative of the request sub-region and the response sub-region may be submitted to the first driver. Results of processing the request may be received at the response sub-region.

18 Claims, 3 Drawing Sheets

(56) References Cited

U.S. PATENT DOCUMENTS

| | | | | |
|---|---|---|---|---|
| 6,757,768 B1* | 6/2004 | Potter | | G06F 13/36 |
| | | | | 710/112 |
| 7,644,237 B1* | 1/2010 | Petersen | | G06F 12/0831 |
| | | | | 711/124 |
| 7,792,102 B2* | 9/2010 | Cornett | | H04L 47/10 |
| | | | | 370/389 |
| 9,720,733 B1* | 8/2017 | Konda | | G06F 9/4881 |
| 9,965,419 B1 | 5/2018 | Wen et al. | | |
| 10,095,543 B1 | 10/2018 | Griffin et al. | | |
| 10,275,352 B1* | 4/2019 | Balakrishnan | | G06F 13/1626 |
| 2002/0073261 A1* | 6/2002 | Kosaraju | | G06F 13/36 |
| | | | | 710/240 |
| 2006/0230119 A1* | 10/2006 | Hausauer | | H04L 47/6265 |
| | | | | 709/216 |
| 2009/0089510 A1* | 4/2009 | Lee | | G06F 12/0815 |
| | | | | 711/141 |
| 2010/0241848 A1* | 9/2010 | Smith | | H04L 63/0442 |
| | | | | 713/153 |
| 2011/0161705 A1* | 6/2011 | Vash | | G06F 13/00 |
| | | | | 713/323 |
| 2011/0231612 A1* | 9/2011 | Karlsson | | G06F 12/0862 |
| | | | | 711/119 |
| 2012/0033673 A1* | 2/2012 | Goel | | G06F 9/45558 |
| | | | | 370/400 |
| 2013/0160028 A1* | 6/2013 | Black | | G06F 15/17325 |
| | | | | 719/314 |
| 2014/0281171 A1* | 9/2014 | Canepa | | G06F 3/0688 |
| | | | | 711/103 |
| 2014/0310555 A1* | 10/2014 | Schulz | | G06F 11/2007 |
| | | | | 714/4.2 |
| 2015/0212795 A1* | 7/2015 | Ilan | | G06F 12/0888 |
| | | | | 711/126 |
| 2016/0179702 A1* | 6/2016 | Chhabra | | G06F 21/72 |
| | | | | 713/193 |
| 2018/0095750 A1 | 4/2018 | Drysdale et al. | | |
| 2018/0129616 A1* | 5/2018 | Liang | | G06F 9/5077 |
| 2018/0300140 A1* | 10/2018 | Maeda | | G06F 13/00 |

OTHER PUBLICATIONS

Langley et al., "Elliptic Curves for Security," Internet Research Task Force (IRTF), No. RFC 7748, 2016, 22 pages.

Lu et al., "System V Application Binary Interface AMD64 Architecture Processor Supplement (with LP64 and ILP32 Programming Models)," K1OM Architecture Processor Supplement, v1.0, 2015, 157 pages.

Rescorla, "The Transport Layer Security (TLS) Protocol Version 1.3," Network Working Group, No. RFC 8446, 2018, 156 pages.

Singhal et al., "Atomic Read Modify Write Primitives for I/O Devices," Intel Corporation, 2008, 8 pages.

* cited by examiner

CONTROLLING OPERATION OF MULTIPLE COMPUTATIONAL ENGINES

BACKGROUND

The present invention relates to physical computing devices, especially, to computer-implemented methods for controlling operation of multiple computational engines of physical computing devices.

A Hardware Security Module (HSM) refers to a piece of hardware and associated software/firmware that may be attached to a server and provides at least the minimum of cryptographic functions. HSM devices act as trust anchors that protect the cryptographic infrastructures by securely managing, processing and storing cryptographic keys on the physical device itself. The HSM device enables a multi-tenancy architecture in which one or more engines of the HSM device may serve multiple callers.

SUMMARY

Various embodiments provide a computer-implemented method for controlling operation of multiple computational engines of a physical computing device, multiplexer module and physical computing device as described by the subject matter of the independent claims. Advantageous embodiments are described in the dependent claims. Embodiments of the present invention can be freely combined with each other if they are not mutually exclusive.

In one aspect, the invention relates to a computer-implemented method for controlling operation of multiple computational engines of a physical computing device. The computer-implemented method includes providing a multiplexer module in the device, wherein the multiplexer module includes a first and second memory region. A data processing request is received from a first driver at the multiplexer module, wherein the data processing request is to be processed by a first set of one or more computational engines of the computational engines. Upon receiving the data processing request, a request sub-region of the first region and a response sub-region of the second region are assigned to the first driver. Data indicative of the request sub-region and the response sub-region are communicated to the first driver, thereby causing the first driver to exclusively write data of the request in the request sub-region until the writing of data is completed. Subsequent to receiving at the multiplexer module from the first driver information indicating that the first driver has completed the writing of data of the request, the data of the request is dispatched to the first set of engines. Results of processing the request are received at the response sub-region. The first driver is used to exclusively access the results in the response sub-region In another aspect, the invention relates to a multiplexer module for a physical computing device. The multiplexer module includes a first and second memory region. The multiplexer module is configured to receive from a first driver a data processing request to be processed by a first set of one or more computational engines of multiple computational engines of the physical computing device. Upon receiving the data processing request, a request sub-region of the first region and a response sub-region of the second region are assigned to the first driver. Data indicative of the request sub-region and the response sub-region are communicated to the first driver, thereby causing the first driver to exclusively write data of the request in the request sub-region until the writing of data is completed. Subsequent to receiving from the first driver information indicating that the first driver has completed the writing of data of the request, the data of the request is dispatched to the first set of engines. Results of processing the request are received at the response sub-region. The first driver is caused to exclusively access the results in the response sub-region.

In another aspect, the invention relates to a physical computing device comprising a multiplexer module in accordance with the previous embodiment, and multiple computation engines.

BRIEF DESCRIPTION OF THE DRAWINGS

In the following embodiments of the invention are explained in greater detail, by way of example only, making reference to the drawings in which.

DETAILED DESCRIPTION

Figure 1:
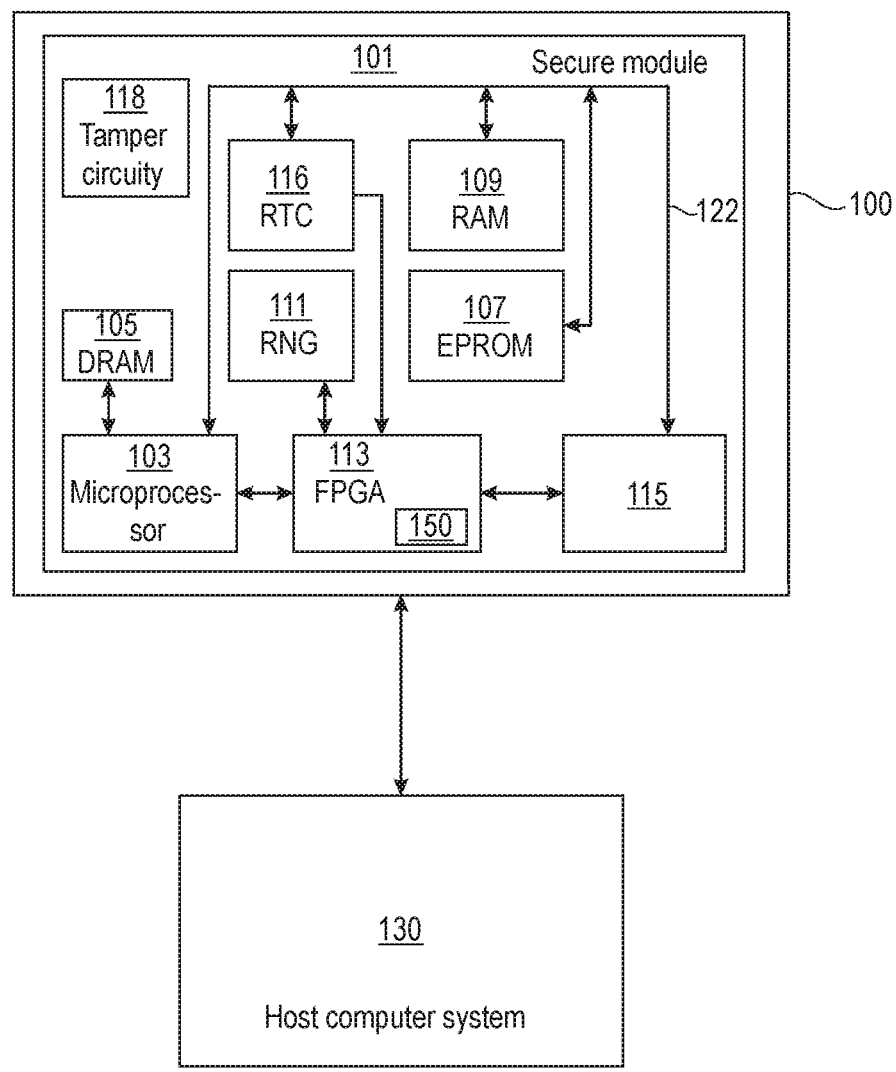
FIG. 1 depicts a block diagram of a physical computing device in accordance with an example of the present subject matter.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Multi-tenant computing architectures which are for example typical in hardware security modules (HSMs), need to arbitrate access to shared hardware-embedded cryptographic engines. This access arbitration may be enabled by the present multiplexer module (which may be referred to as multiplexer) for physical computing devices such as devices having a multi-tenant computing architecture. The present subject matter may provide a low latency and reliable separation of multiple tenants' requests without excessive arbitration overhead. The multiplexer module may be capable of managing unrelated memory regions without concurrency-related arbitration.

The multiplexer module may be a hardware system which may present a unified interface to suitable engines under restrictions typical for coprocessors. The present subject matter may extend semantics of atomic integer types to represent request/response buffers and allow a safe concurrent access without software-enforced serialization for an arbitrary number of engine-using entities. The present subject matter may centralize buffer management in the multiplexer module, thereby minimizing the use of pre-allocated buffers in drivers. Conceptually, the present subject matter may combine many advantages of transactional memories with the mechanisms of atomic access to primitive types, for restricted use cases.

The present subject matter may enable a hardware-assisted lock-free queue management with inherent concurrency resolution in cryptographic accelerator engines. In particular, the present subject matter may prevent performing synchronization in drivers. Such synchronization in drivers needs to deal with larger data structures, and therefore involves lock-related functionality, even on systems where accessing primitive data types, such as 32-bit or 64-bit integers, may be inherently atomic. Especially in larger systems, or those with wide disparities in response latencies and/or bulk-data sizes, locking overhead may quickly emerge as a performance bottleneck. Fast cryptographic operations on small amounts of data have been shown to suffer order-of-magnitude performance degradation under real-world scenarios due to lock contention and the overhead of buffer management. For example, the data processing request may be a request for a cryptographic operation. The computational engines may be cryptographic engines, and the physical computing device may be a HSM.

Another advantage may be the following: since only a minimal driver functionality is required, the present subject matter may operate with an entire driver stub included in a code executed by each process, without a standalone global driver.

The present subject matter may enable an efficient, consistent and systematic method for accessing hardware resources by single requests and may enable to synchronize between multiple requests to safely access shared hardware resources.

In one example, the communicating of the data indicative of the request sub-region and the response sub-region may comprise communicating the location, size and properties of the request sub-region and the response sub-region to the first driver (which may be a driver instance) through memory-range descriptors specifying them, and deposited into driver-owned memory by the multiplexer module. The request sub-region and the response sub-region form a pair of sub-regions that are exclusively assigned to the first driver. An example of the properties may be ownership (ID) information of the memory region allocated to the first driver e.g. including a PCIe "process context identifiers" (PCIDs) to inform the first driver.

According to one embodiment, the computer-implemented method further comprises: receiving from a second driver at the multiplexer module another data processing request to be processed by a second set of one or more computational engines of the computational engines; subsequent to receiving the other data processing request, assigning another distinct request sub-region of the first region and another distinct response sub-region of the second region to the second driver, thereby causing the second driver to exclusively write data of the other request in the other request sub-region until the writing of data is completed by the second driver; subsequent to receiving at the multiplexer module from the second driver information indicating that the second driver has completed the writing of data of the other request, dispatching the data of the request to the second set of engines; receiving results of processing the other request at the other response sub-region; causing the second driver to exclusively access the results in the other response sub-region.

The first and second drivers may for example be instances of a same driver or may be different drivers. For example, the other data processing request may be received before the processing of the request is ended. Assigning separate and distinct memory areas that are only accessible by the respective drivers may provide a consistent data content and accurate data processing results. By processing the two requests one after the other, the shared engines between the two requests may safely and efficiently be used. According to one embodiment, the second set of engines comprises at least part of the first set of engines.

According to one embodiment, the two requests are competing requests. For example, the two requests may be competing simultaneous requests for access to a shared resource of computational engines. This embodiment may provide a multiplexer module with enhanced arbiter functionality.

According to one embodiment, the receiving of the data processing request comprises: exposing a single register of the multiplexer module to requests destined to the multiple computational engines; receiving at the single register a value indicative of the first driver and of the data processing request. For example, the multiplexer module may expose a single register, sized and aligned such that accessing it is inherently atomic under processor/bus serialization rules. Since implicit serialization orders writes to this single register, an arbitrary number of drivers may safely issue them.

According to one embodiment, the value is an address descriptor indicative of a writable address in a host memory area of the first driver. For example, this value may be used by the multiplexer module to write the data, to be communicated to the first driver, to this host memory area.

According to one embodiment, the communicating of data comprises sending an acknowledgement of request acceptance to the first driver.

According to one embodiment, the acknowledgment comprises acknowledgment data indicative of the request sub-region and the response sub-region and an interrupt-generating address, which corresponds to the last bytes of the response sub-region.

According to one embodiment, the sending comprises writing the acknowledgement data in a host memory area of the first driver that is indicated in the received request.

According to one embodiment, the request sub-region is a write-only region that can be written to by the first driver only. For example driver instances may be prohibited from writing into each other's request sub-regions by origin separation, which identifies the driver instance. This may require that a caller software is able to operate with write-only memory regions and lacking the capability to read back any previously written data. Mandating coexistence with write-only memory enables to simplify managing confidentiality: host-provided data may not be readable once passed to the multiplexer module (e.g., there may be no need to add access controls only to protect confidentiality between driver instances).

According to one embodiment, the response sub-region is readable by the first driver only. The access to the request and response sub-regions may be controlled by the multiplexer module using following example implementations.

As the multiplexer module may manage sensitive data for multiple, potentially mutually suspicious callers/drivers, the present method may further include access control features. The access control may for example be performed as follows. If the multiplexer module may interact with an MMU of the physical computing device, and infer addresses of the referencing driver instance, access control may be derived from MMU-visible separation features. This may be advantageous as passing MMU-visible process information to hardware may be performed in systems, such as the multiplexer module, which already use MMU-enforced process separation between their co-resident entities. Thus, using a hardware-observable MMU setup for access-control purposes may be performed for the multiplexer module. In this way, the multiplexer module may identify the counterparty referencing its memory regions, and allow or refuse access to the memory regions. When correlating access control with external addresses, the original request access may be followed, and ensure subsequent operations are from the same address range (i.e., driver instance).

In the absence of a MMU-enforced separation, request-specific nonces may be used so that access may be granted to the driver who presents the nonce. The nonce may be of a predefined size and short lived e.g. nonces of 64 bits may advantageously be used to authenticate ownership of a request. For a nonce-based request authentication, the multiplexer module (e.g. used for high-assurance cryptographic coprocessors) may use and have a direct access to a high-quality random-number generator. The nonce may be supplied either with the request notification or by passing it back to the driver as an acknowledgment. The access control of the response sub-region may similarly be authenticated by the same nonces, which the driver instance may retain for the entire request lifecycle. As an example, after a driver instance is notified of a response arrival, it would be expected to respond with a write of the nonce to the response address. While the write operation may be dropped by the multiplexer module, (since it targets a read-only address range) it shows that the originator is in possession of the proper nonce.

According to one embodiment, the received information indicating that the first driver has completed the writing of data of the request may provide a trigger signal. The trigger signal may be caused by the received information. In one example, writing the last word of the request sub-region may provide the trigger signal. In another example, writing the word just after the request sub-region, which is invalid but detectable, may provide the trigger signal.

According to one embodiment, causing the first driver to exclusively access the results in the response sub-region comprises sending an interrupt signal to the first driver by writing by the multiplexer module in a host memory region of the first driver an interrupt-generating address, which corresponds to the last bytes of the response sub-region; thereby waking up the first driver.

According to one embodiment, the computer-implemented method further comprises receiving a notification indicative that the first driver reads the last word of the response sub-region; releasing the assigned request sub-region and response sub-region.

According to one embodiment, the received request is part of a sequence of requests of respective drivers being sequenced by a bus system of the device. This may enable the multiplexer module to reuse bus-inherent atomicity to allow multi-tenant driver support without scalability-limiting locking.

According to one embodiment, assigning the request and response sub-regions, comprises determining the size of the result and request sub-regions based on a predefined worst-case size limit associated with a request's type of the received request. Size restrictions may trade off granularity and the amount of memory they reserve. These may combine into an upper bound of queue depth which may be managed. As a cryptographic example, worst-case inputs to reasonable Rivest-Shamir-Adleman (RSA) operations fit approximately 4 KB s, and elliptic curve (EC) operations approximately require 512 bytes. This embodiment may allow an improvement in maximum parallelism e.g. when the same amount of memory is available to the multiplexer module.

According to one embodiment, the data operation request is a request for a cryptographic operation, wherein the physical computing device is a hardware security module (HSM).

FIG. 1 depicts a diagram of a physical computing device 100 in accordance with an example of the present subject matter. The physical computing device may be configured to perform computations such as cryptographic computations using hardware-embedded computational engines. For exemplification purpose, the physical computing device of FIG. 1 is described as a HSM. The physical computing device 100 is configured to connect or attach to a host computer system 130 via for example a PCI or PCIe interface e.g. the physical computing device 100 may be configured to be inserted in a PCIe slot of the host computer system 130. The physical computing device 100 may for example be an integrated set of security components that may be used individually or together to provide cryptographic functions and application programming interfaces (APIs) that provide functions that may be needed by the host computer system 130. For example, cryptographic functions that may be used by the host computer system 130 may be implemented in the physical computing device 100. This may be advantageous as the host computer system 130 may perform other operations by its available CPU. In addition, the implementation in the physical computing device 100 is a secured implementation.

The host computer system 130 may comprise one or more applications, wherein the execution of an application of the applications may cause the application to perform calls (the application or the portion of the application that performs the call may be named caller) for functions to be performed by the physical computing device 100. The host computer system 130 may further comprise one or more drivers that enable communication of data between the callers and the physical computing device. The driver may be associated with or may own a buffer or memory area of the host computer system 130.

The physical computing device 100 may for example be implemented in the form of a PCIe adapter card that can be plugged in the host computer system 130. For example, the physical computing device 100 may be a cryptographic coprocessor such as the 4768 PCIe cryptographic coprocessor which is also known as HSM.

The physical computing device 100 comprises a secure module 101 containing security-related components and a base card that interfaces with the secure module 101. The secure module 101 may for example be designed to meet the security requirements of the FIPS 140-2 standard.

The internal components of the secure module 101 comprise a processor subsystem consisting of a microprocessor 103, with a dynamic random-access memory (e.g. SDRAM) 105, a flash-erasable programmable read-only memory (flash EPROM) 107 for persistent data storage, and a static RAM 109 backed up with battery power when the physical computing device 100 is powered off. The microprocessor 103 serves as the primary controller of operations of the physical computing device 100. The microprocessor 103 may for example orchestrate operation of the hardware in the card and implement communications with the host computer system 130 and the cryptographic API functions that comprise the external interface from host application programs to the device. The secure module 101 is designed with a tamper-detection circuitry or tamper controller 118 which is configured for preventing physical intrusions. The secure module 101 may further comprise a hardware-based cryptographic-quality random number source 111. The cryptographic-quality number source 111 includes hardware redundancy in all cryptographic algorithms so that any errors will be detected and will prevent erroneous results. In addition, a real-time clock (RTC) module 116 maintains the date and time for use by the microprocessor 103.

An internal PCI bus 122 is used to interconnect the microprocessor 103 and other hardware devices on the card. The bus 122 may be provided with a PCI arbiter to provide arbitration for multiple competing requests received at the bus from one or more drivers of the host computer system 130. The arbitration may result in serializing the competing requests in accordance with a predefined scheme. The secure module 101 may store software that runs on the microprocessor 103.

The secure module 101 may further comprise a field-programmable gate array (FPGA) 113. The FPGA 113 may be configured to support high-performance communications to the device 100 and between the microprocessor and cryptographic engines 115 inside the device. For example, the secure module 101 may store an application program that runs on the microprocessor 103 to give the engines 115 the cryptographic API functions seen by programs of the host computer system 130.

For example, the FPGA 113 includes a multiplexer module 150. In this way, callers of the host computer system do not directly interact with the engines 115 as the interaction with the engines 115 is controlled by the multiplexer module 150. The multiplexer module 150 is configured to provide a direct memory access (DMA) logic, possibly including access-control features, such as restricting transfers when it may be made aware of tenant/process identities and address ranges assigned to tenants.

Figure 2:
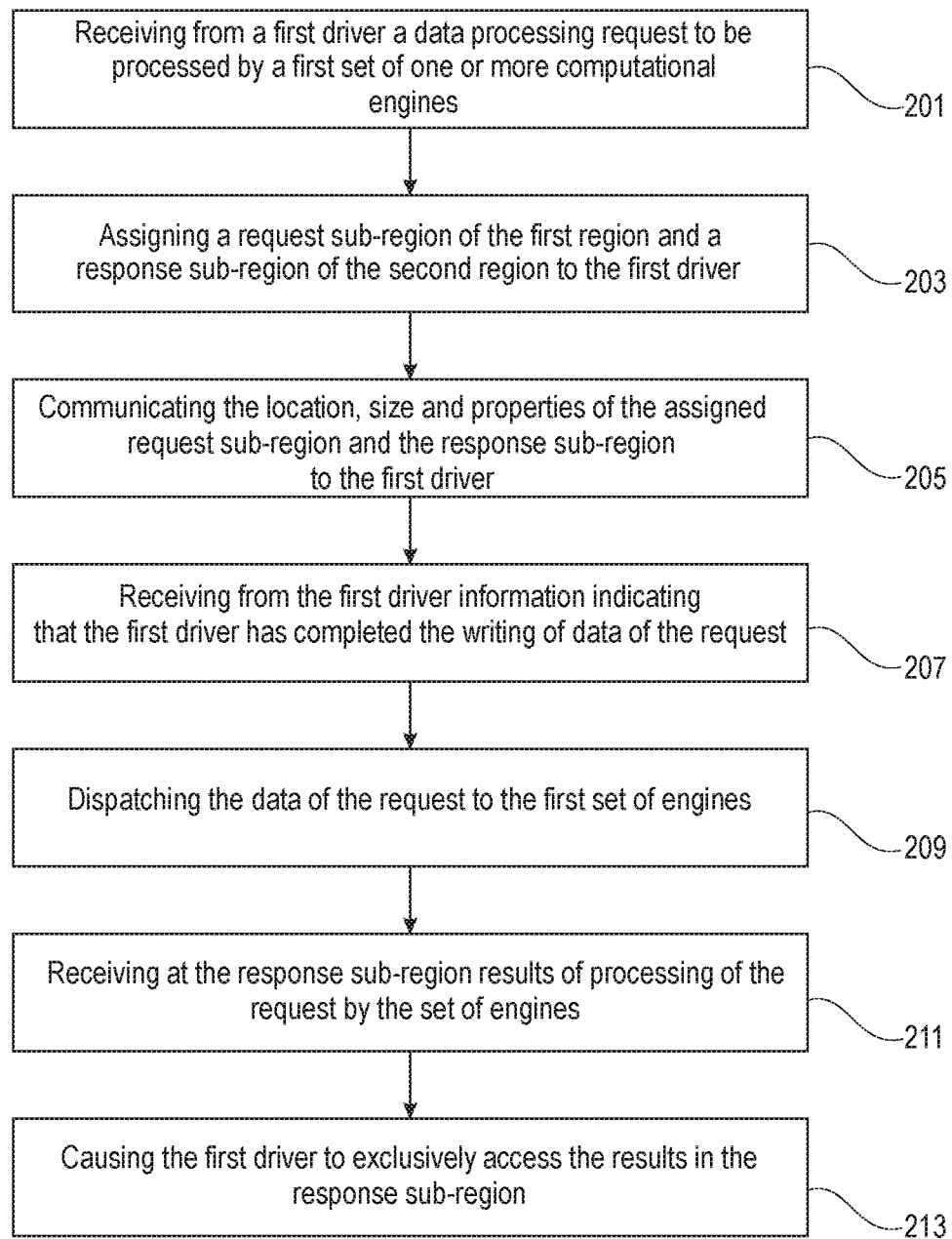
FIG. 2 is a flowchart of a computer-implemented method for controlling operation of multiple computational engines such as cryptographic engines of a physical computing device.

FIG. 2 is a flowchart of a computer-implemented method for controlling operation of multiple computational engines such as cryptographic engines 115 of a physical computing device e.g. 100. The physical computing device may for example be configured to be connected (e.g. plugged in) to a host computer system e.g. 130. The host computer system may be configured to execute one or more host applications, wherein host applications may perform calls to one or more functions that can be implemented by the physical computing device. These calls are received by one or more drivers of the host computing device before being communicated to the physical computing device. A driver of the host computing system may own a memory area of the host computer system.

For performing at least part of the present computer-implemented method, the physical computing device, e.g. as described for example with reference to FIG. 1, may be provided with a multiplexer module e.g., 150. The multiplexer module may comprise a first and second memory region. The two memory regions may provide sufficient DRAM for the multiplexer module for transient storage of pending requests. The multiplexer module may utilize that sufficiently large memory window to simultaneously maintain address regions for many requests. This may be advantageous as it may remove the need for most driver-based buffering by remapping memory through the multiplexer module and may reduce allocation loss due to centralization, compared to fully driver-owned buffers.

The multiplexer module may receive in step 201 from a first driver a data processing request (or request) to be processed by a first set of one or more computational engines of the computational engines 115. The first driver may for example be an instance of a given driver of the host computer system. The received request may for example initiate data transfer from a host memory of the first driver. The initiation of data transfers from the host memory may use descriptors indicating DMA-usable base addresses and lengths. Descriptors may fit processor-primitive types which are suitable for processor-enforced atomic updates, such as 32-bit or 64-bit integers on all contemporary processors. The size of a request sub-region and response sub-region may be indicated in the received request. For example, size ranges may be encoded in addresses and descriptors are expected to combine both (address and size information) into processor-primitive types. This may be advantageous as few bits may suffice for encoding size information. For example, for systems with a limited number of quantized size choices, a few bits in an annotated address may suffice to specify worst-case request and response size limits (e.g. indicating to reserve memory for a request of type X, may imply request and response sizes no more than N and M bytes, respectively, and informing the first driver about the location of request-specific structures at address Y in its address space). Thus, received requests at the multiplexer module may be restricted to fixed sizes, possibly in several categories, each with its own worst-case size limit. For example, a short encoding may be suitable for embedding as several "address" bits, may be sufficient.

For receiving requests from the drivers of the host computer system, the multiplexer module may expose a single register of the multiplexer module to requests destined to the multiple computational engines 115. This single register may receive a value indicating that the first driver has sent the data processing request. For example, the multiplexer module exposes a single "request submission" register, sized and aligned such that accessing it is inherently atomic under processor/bus serialization rules. Since implicit serialization orders writes to this register, an arbitrary number of drivers may safely issue them. When heavily loaded, the multiplexer module may interact with the bus of the physical computing device to ensure all writes to its register are accounted for, typically by delaying acknowledgments to the bus.

The received request may for example indicate the memory owned by the first driver such that the multiplexer module can use it to write data. That written data may then be accessed by the first driver as being data destined to the first driver. In another example, the multiplexer module may have predefined information indicating one or more memory areas of the host computer system that can be used by the multiplexer module to write data destined to drivers of the host computer system.

The received request may be part of a series of competing requests that is serialized by the bus of the physical computing device. The bus may provide arbitration for the competing requests received at the bus from one or more drivers of the host computer system. The arbitration may result in serializing the competing requests in accordance with predefined request-serialization policies. Relying on request-serialization policies of small, atomic transfers of the underlying transport mechanism may avoid synchronization by drivers or the multiplexer module itself, by processing requests in the unambiguous order assigned to them by transport arbitration.

Subsequent to receiving the data processing request, the multiplexer module may assign in step 203 a request sub-region of the first region to the first driver and assign a response sub-region of the second region to the first driver. For example, after a transfer is initiated through a descriptor of the received request, the multiplexer module may use these address regions (i.e. the request and response sub-regions) for bulk data associated with requests and responses. The request sub-region is assigned to the first driver for writing only. The caller software or host application may thus be able to operate with "write-only memory regions" lacking the capability to read back any previously written data in the request sub-region. Mandating coexistence with write-only memory may enable to simplify managing confidentiality: host-provided data may not be readable once passed to the multiplexer module (e.g., there is may be no need to add access controls only to protect confidentiality between driver instances or between multiple drivers). Thus, the request sub-region is assigned to the first driver such that the first driver has an exclusive write access to exclusively write data of the request in the request sub-region. This exclusive access may end at the time the writing of data is completed by the first driver or at the time the request sub-region is released.

The multiplexer module may communicate in step 205 the location, size and properties of the assigned request sub-region and the response sub-region to the first driver. This communication may for example be performed through memory-range descriptors specifying them, and deposited into the first driver-owned memory by the multiplexer module. This communication may enable the first driver to perform write access to the request sub-region.

In one example, the communicating of step 205 may comprise sending by the multiplexer module an acknowledgment of the received request to the first driver that indicates the location size and properties of the two sub-regions. For that, the multiplexer module may write acknowledgment data in the memory owned by the first driver. The acknowledgment data may for example comprise three addresses. The three addresses may comprise a start address of the request sub-region and a start address of the response sub-region. The three addresses may further comprise an interrupt-generating address, which corresponds to the last bytes of the response sub-region. In another example, the interrupt-generating address may not be submitted as it may be inferred from the address of the response sub-region and the size of the response sub-region. Providing separately the interrupt-generating address (without inferring it) may simplify setting up interrupt handlers.

The multiplexer module may receive in step 207 from the first driver information indicating that the first driver has completed the writing of data of the request. The received information may provide an interrupt that signals that an event needs the attention, namely the event of completion of the writing of the data of the request by the first driver. The trigger may be implemented, in one example, as follows. When the first driver has copied all request data into the request sub-region, it informs the multiplexer module by writing to the last word of the request sub-region. This interrupt-triggering write operation "hands over" ownership of the request-data region from first driver to multiplexer module.

Subsequent to receiving from the first driver information indicating that the first driver has completed the writing of data of the request, the multiplexer module may dispatch in step 209 the data of the request to the first set of engines. For example, when triggered by the interrupt-triggering write operation, the multiplexer module dispatches data from the request sub-region; and results from the set of engines show up in the corresponding response sub-region.

The results of processing of the request by the set of engines may be received in step 211 at the response sub-region that is assigned to the first driver in association with the request sub-region. For example, the appearance of response data generates an asynchronous notification interrupt, writing the originally returned interrupt-generating address (with the same contents). This interrupt wakes up the first driver, and at this point, the entire engine output is visible in the response-data region, and the first driver may pass it back to the original caller.

The first driver may be caused in step 213 to exclusively access the results in the response sub-region. For example, an interrupt signal may be sent to the first driver by writing by the multiplexer module in a host memory region of the first driver an interrupt-generating address, which corresponds to the last bytes of the response sub-region. The written interrupt interrupt-generating address may be the interrupt-generating address that has been sent as part of the acknowledgment data. For example, the appearance of response data generates an asynchronous notification interrupt writing the originally returned interrupt-generating address (with the same contents). This interrupt wakes up the first driver. At this point, the entire engine output of the set of one or more engines is visible in the response sub-region, and the first driver may pass it back to the original caller.

Figure 3:
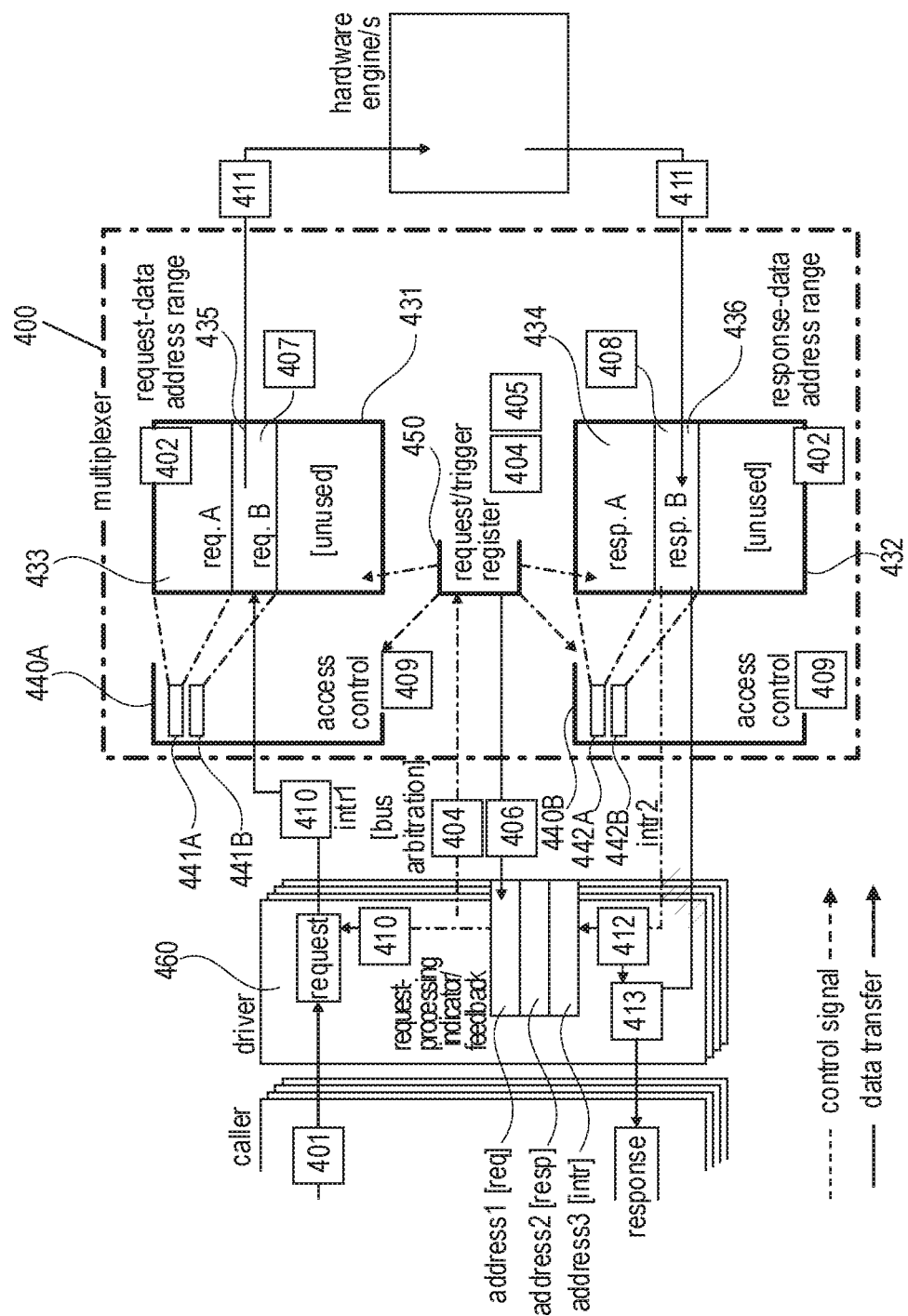
FIG. 3 depicts a block diagram illustrating a request-response flow through a hardware-controlling multiplexer module in accordance with an example of the present disclosure.

FIG. 3 depicts a block diagram illustrating a request-response flow through a hardware-controlling multiplexer module (of a physical computing device) in accordance with an example of the present disclosure. The request-response flow as described with reference to FIG. 3 may not require coordination between multiple callers submitting requests. For example, software-visible multiplexer interfaces of the multiplexer may be restricted to a few software-addressable memory windows and the submission window.

For example, a caller of one or more applications of a host computer system may send a request for performing computation or other processing by a set of one or more computational engines e.g. of a HSM. A host software driver 460 may assemble (401) data corresponding to a single request such as the received request of the caller. Once handed over to the driver, the applications may block waiting for a response. In the example of FIG. 3, two requests A and B are shown as being processed in accordance with the present subject matter. Request A is already being processed. The present flow may be described with reference to request B which has just been submitted.

The multiplexer 400 owns (402) two address-range windows (or tow memory regions), one 431 for request-data submission and one 432 to present responses to drivers/callers. These address ranges may lack a fixed layout as they are partitioned dynamically as requests arrive. The request-data window 431 is a write only window, preventing reads and avoiding the need for read-access control between multiple callers. The response-data window 432 is a read-only window for the corresponding driver. As shown in FIG. 3, request A is already being assigned its own respective sub-regions 433 and 434 of the address-range windows 431 and 432 respectively.

The multiplexer exposes (404) a single request submission register 450 sized and aligned such that accessing it is inherently atomic under processor/bus serialization rules. Since implicit serialization orders writes to this register 450, an arbitrary number of drivers may safely issue them. When heavily loaded, the multiplexer 400 may for example interact with a bus of the physical computing device to ensure all writes to its register 450 are accounted for, typically by delaying acknowledgments to the bus.

An arrival (405) of an address descriptor (or arrival of an integer representing an address descriptor) in the register 450 informs the multiplexer 400 about the new request B, and the driver instance 460 submitting the request B. The value written to the request-submission register 450 is a writable address in a driver's memory window of the driver 460 e.g. the value indicates to the multiplexer 400 where to write data destined for the driver 460. The multiplexer module may assign to the driver 460 of the received request B a request sub-region 435 and response sub-region 436 of the request data window 431 and response data window 432 respectively. Request-assigned sub-regions for requests A and B are intentionally different in size to illustrate that the multiplexer 400 manages its address ranges dynamically, and does not rely on pre-allocated regions of offline-determined sizes.

As an acknowledgment of request acceptance, the multiplexer 400 writes (406) three addresses pointing to the request and response sub-regions 435 and 436 that are assigned to the driver 460. This writing may be performed in the location specified by the driver 460 in the value stored in the request submission register 450. The three addresses may be the following: a start address of the request sub-region 435 whose size may be specified from the received request-initiating write; a start address of the response sub-region 436 whose size may be inferred from the received request-imitating write and an interrupt-generating address, which corresponds to the last bytes of the response sub-region 436. Instead of being separately submitted, the interrupt-generating address may alternatively be inferred from the response address and the size.

The newly reserved request sub-region 435 is writable (407) by the driver 460 it has been assigned to and it is not readable by anyone else on the host computer system. The driver 460 may copy request structures directly into this request sub-region 435. The newly reserved response sub-region 436 is only readable (408) by the driver 460 it has been assigned to. It may contain the results of engine operations upon completion. The last word in the response sub-region 435 is special, writing it is an indicator to the multiplexer 400. Since multiplexer-owned memory windows might become fragmented, periodic garbage collection may be used to simplify allocation-assisting functionality of the multiplexer. For example, long-running requests might simplify request-data management by notifying the multiplexer when their data has been read by the engine. For example, the present system may employ hardware-fixed worst-case data size limits, or may allow setting discrete values through write-once registers during initialization (and then the addresses may include an index into the runtime-configurable array of worst-case sizes).

If the multiplexer is integrated (409) with a MMU, or is at least aware of caller separation, it may also include access-control in hardware providing access controlling lists 440A and 440B. Each of the windows 431 and 432 may be associated with a respective access controlling lists 440A and 440B. For example, for each of the received requests A and B two access controlling entries are provided. Request A is associated with access control entry 441A to control access to its request sub-region 433 of the request data window 431 and with access control entry 442A to control access to its response sub-region 434 of the response data window 432. Request B is associated with access control entry 441B to control access to its request sub-region 435 of the request data window 431 and with access control entry 442B to control access to its response sub-region 436 of the response data window 432. Dynamically populated as requests are managed, these access-controlling lists ensure that only (the address range of) the caller who initiated the requests is allowed to access multiplexer-owned request/response regions. Access-control list entries are updated as request-data and response-data regions are allocated within the two multiplexer-controlled windows 431 and 432.

When the driver 460 has copied (410) all request data into the request data sub-region 435, it informs the multiplexer 400 by writing to the last word of the request sub-region 435 (interrupt "intr1"). This write access hands over ownership of the request sub-region 435 from the driver 460 to the multiplexer 400.

When triggered by the interrupt-triggering write operation, the multiplexer dispatches (411) data from the request sub-region 435 and results from the engine show up in the corresponding response sub-region 436. Since the multiplexer 400 is in full control of memory and access to engines, implementations to map regions accessed by the engine directly in an engine-accessible form may be performed, avoiding unnecessary copies.

The appearance of response data generates (412) an asynchronous notification interrupt ("intr2"), writing the originally returned interrupt-generating address (with the same contents). This interrupt wakes up the driver 460. At this point, the entire engine output is visible in the response sub-region 436, and the driver 460 may pass it back to the original caller. After passing back (413) results to its caller, the driver 460 reads the last word of the response-data sub-region 436. This notifies the multiplexer that the driver 460 considers this request B terminated. This may trigger a request-terminating cleanup. As part of the request-terminating cleanup, the multiplexer 400 may release request and response sub-regions 435 and 436, and any corresponding access-control structures. After cleanup, when multiplexer-internal structures are purged, memory regions may no longer be accessed by the driver 460. Therefore, there is no need to update the original multiplexer-assigned address-structure written to driver-owned memory (in step 406). Driver-turnaround is accelerated slightly by saving a post-cleanup multiplexer-to-driver transfer, since it allows the driver to set up the next request immediately after responding to the previous one.

A shown in FIG. 3, a request submission may require a single register write, and interrupt notifications may be through request-dedicated or driver-owned memory. FIG. 3 shows how a driver-owned memory would coexist with multiple driver instantiations. For example, the drivers may elect to provide a single driver instance, and maintain centralized structures for their multiple callers, without impacting the multiplexer's operations. Since the entire data uses memory regions dedicated to one entity authorized to write them, cache flushing operations may be sufficient to synchronize data. For example, copying data from the caller to the request sub-region may comprise flushing the driver to the multiplexer and results copied out from the response sub-region may be flashed.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for controlling operation of multiple computational engines of a physical computing device, the computer-implemented method comprising:
   providing a multiplexer module in the device, the multiplexer module comprising a first and second memory region;
   receiving from a first driver at the multiplexer module a data processing request to be processed by a first set of one or more computational engines of the computational engines;

subsequent to receiving the data processing request, assigning a request sub-region of the first region and a response sub-region of the second region to the first driver;

communicating data indicative of the request sub-region and the response sub-region to the first driver, thereby causing the first driver to exclusively write data of the request in the request sub-region until the writing of data is completed;

subsequent to receiving at the multiplexer module from the first driver information indicating that the first driver has completed the writing of data of the request, dispatching the data of the request to the first set of engines;

receiving results of processing the request at the response sub-region; and causing the first driver to exclusively access the results in the response sub-region, wherein causing the first driver to exclusively access the results in the response sub-region comprises sending an interrupt signal to the first driver by writing in a host memory region of the first driver an interrupt-generating address, which corresponds to the last bytes of the response sub-region, thereby waking up the first driver.

2. The computer-implemented method of claim 1, further comprising:

receiving from a second driver at the multiplexer module another data processing request to be processed by a second set of one or more computational engines of the computational engines;

subsequent to receiving the other data processing request, assigning another distinct request sub-region of the first region and another distinct response sub-region of the second region to the second driver, thereby causing the second driver to exclusively write data of the other request in the other request sub-region until the writing of data is completed;

subsequent to receiving at the multiplexer module from the second driver information indicating that the second driver has completed the writing of data of the other request, dispatching the data of the request to the second set of engines;

receiving results of processing the other request at the other response sub-region;

causing the second driver to exclusively access the results in the other response sub-region.

3. The computer-implemented method of claim 2, wherein the second set of engines comprises at least part of the first set of engines.

4. The computer-implemented method of claim 2, wherein the data processing request and the other data processing request are competing requests.

5. The computer-implemented method of claim 1, the receiving of the data processing request comprising:

exposing a single register of the multiplexer module to requests destined to the multiple computational engines; and receiving at the single register a value indicative of the first driver and of the data processing request.

6. The computer-implemented method of claim 5, the value being an address descriptor indicative of a writable address in a host memory area of the first driver.

7. The computer-implemented method of claim 1, wherein the request sub-region is a write-only region that can be written to by the first driver only.

8. The computer-implemented method of claim 1, wherein the response sub-region is readable by the first driver only.

9. The computer-implemented method of claim 1, wherein the received information provides a trigger signal.

10. The computer-implemented method of claim 1, further comprising receiving a notification indicating that the first driver has read the last word of the response sub-region; releasing in response to the notification the assigned request sub-region and response sub-region.

11. The computer-implemented method of claim 1, wherein the received request is part of a sequence of requests of respective drivers, including the first driver, being sequenced by a bus system of the device.

12. The computer-implemented method of claim 1, wherein assigning the request and response sub-region, comprising determining the size of the result and request sub-regions based on a predefined worst-case size limit associated with a request's type of the received request.

13. The computer-implemented method of claim 1, wherein the data operation request is a request for a cryptographic operation, wherein the physical computing device comprises a hardware security module (HSM).

14. A computer-implemented method for controlling operation of multiple computational engines of a physical computing device, the computer-implemented method comprising:

providing a multiplexer module in the device, the multiplexer module comprising a first and second memory region;

receiving from a first driver at the multiplexer module a data processing request to be processed by a first set of one or more computational engines of the computational engines;

subsequent to receiving the data processing request, assigning a request sub-region of the first region and a response sub-region of the second region to the first driver;

communicating data indicative of the request sub-region and the response sub-region to the first driver, thereby causing the first driver to exclusively write data of the request in the request sub-region until the writing of data is completed;

subsequent to receiving at the multiplexer module from the first driver information indicating that the first driver has completed the writing of data of the request, dispatching the data of the request to the first set of engines;

receiving results of processing the request at the response sub-region; and causing the first driver to exclusively access the results in the response sub-region, the communicating of data comprising sending an acknowledgement of request acceptance to the first driver, wherein the acknowledgment comprises acknowledgment data indicative of the request sub-region and the response sub-region and an interrupt-generating address, which corresponds to the last bytes of the response sub-region.

15. The computer-implemented method of claim 14, wherein the sending comprises writing the acknowledgement data in a host memory area of the first driver that is indicated in the received request.

16. A multiplexer module for a physical computing device, the multiplexer module comprising a first and second memory region, the multiplexer module being configured for:

receiving from a first driver a data processing request to be processed by a first set of one or more computational engines of multiple computational engines of the physical computing device;

subsequent to receiving the data processing request, assigning a request sub-region of the first region and a response sub-region of the second region to the first driver;

communicating data indicative of the request sub-region and the response sub-region to the first driver, thereby causing the first driver to exclusively write data of the request in the request sub-region until the writing of data is completed;

subsequent to receiving from the first driver information indicating that the first driver has completed the writing of data of the request, dispatching the data of the request to the first set of engines;

receiving results of processing the request at the response sub-region; and causing the first driver to exclusively access the results in the response sub-region wherein causing the first driver to exclusively access the results in the response sub-region comprises sending an interrupt signal to the first driver by writing in a host memory region of the first driver an interrupt-generating address, which corresponds to the last bytes of the response sub-region, thereby waking up the first driver.

17. The device of claim 16 further comprising multiple computation engines, wherein the physical computing device comprises a hardware security module (HSM).

18. The device of claim 17 further comprising a bus system configured for processing received requests in accordance with an arbitration algorithm before sequencing the received requests to the multiplexer module.

* * * * *